United States Patent Office 3,500,922
Patented Mar. 17, 1970

3,500,922
FLOODING PROCESS USING A SUBSTANTIALLY ANHYDROUS SOLUBLE OIL
Leo J. O'Brien, Claremont, and Le Roy W. Holm, Fullerton, Calif., assignors to Union Oil Company of California, Los Angeles, Calif., a corporation of California
No Drawing. Filed Sept. 3, 1968, Ser. No. 757,153
Int. Cl. E21b 43/20
U.S. Cl. 166—273                     25 Claims

ABSTRACT OF THE DISCLOSURE

A process for recovering oil from subterranean reservoirs in which a slug of substantially anhydrous soluble oil and a slug of low salt-content water are injected into the reservoir through an injection well, and thereafter a thickened aqueous flooding medium is injected to drive the soluble oil and low salt-content water towards a production well spaced apart in the reservoir from the injection well. The low salt-content water can be followed by a substantially larger slug of thickened flood water, and then by flood water. Also, a series of slugs of substantially anhydrous soluble oil and low salt-content water can be alternately injected into the reservoir ahead of the thickened aqueous flooding medium.

---

This invention relates to the recovery of oil from subterranean petroleum reservoirs, and more particularly to an improved flooding process for the recovery of petroleum.

It has long been recognized that substantial amounts of oil remain unrecovered at the completion of normal primary recovery operations. Hence, various secondary methods of recovering additional quantities of oil have been proposed, such as the well-known technique of water flooding in which water is injected into the reservoir through an injection well to drive additional oil toward one or more production wells spaced apart in the reservoir from the injection well. Although an additional quantity of oil can be recovered by water flooding, the efficiency of the water flood and the ultimate oil recovery can be further improved by introducing a solvent that is miscible with both the connate oil and with the flood water into the reservoir ahead of the flood water. Alcohols and various other organic solvents have been proposed as suitable miscible agents for use in a miscible flooding operation.

Another solvent system miscible with the reservoir oil, but not with water, that has been suggested for use with a water drive and which is superior to the truly miscible solvents comprises a mixture of substantially anhydrous soluble oil and an inert, non-aqueous solvent, preferably admixed in such proportions that the viscosity of the mixture approximates the viscosity of the formation oil. The soluble oil consists of a hydrocarbon phase; one or more soaps or non-soap surface active materials; and a stabilizing agent which is usually a monohydric or polyhydric alcohol, or other partially oxygenated, low molecular weight hydrocarbon, such as a ketone. The soluble oil often contains some free organic acid, and especially a fatty acid, such as oleic acid. These soluble oils are miscible in all proportions with the reservoir oil, and form microemulsions on contacting the flood water and connate water in the reservoir.

It has also been proposed that the flood water be preceded by a microemulsion consisting of a soluble oil containing substantial quantities of water, such as from about 10 to 50 percent or more water. These microemulsions are relatively stable, transparent emulsions of the water-in-oil type, i.e., oil is the continuous phase and small droplets of water are dispersed therein. Also, the use of oil-external emulsion systems followed by water-external emulsions, or thickened flood water has been proposed. Soluble oils generally increase in viscosity on the addition of water, the consistency of the resulting microemulsions depending in part upon the amount of water added. While some increase in viscosity may be desirable for mobility control, microemulsions containing substantial amounts of water are generally difficult to inject into the rather tight formations often encountered in oil-bearing reservoirs.

While the foregoing techniques are effective in recovering more oil than recovered by conventional water flooding, it is nevertheless desirable to even further improve the miscible flooding process to reduce its cost and to recover additional amounts of oil, and to facilitate injection of the displacement fluid into the reservoir.

Accordingly, a principal object of this invention is to provide an improved flooding process for the recovery of petroleum from subterranean reservoirs. Another object of the invention is to provide a more efficient oil recovery process. A further object of the invention is to provide an oil recovery process that minimizes the amount of soluble oil required for effective oil recovery. A still further object of the invention is to provide an oil recovery process in which injection of the displacement agent is facilitated. Other objects and advantages of the invention will be apparent from the following description.

Briefly, this invention contemplates a process for recovering oil from subterranean reservoirs in which successive slugs of substantially anhydrous soluble oil and low salt-content water are alternately injected into the reservoir through an injection well, and thereafter a thickened aqueous flooding medium is injected to drive the soluble oil and low salt-content water towards a production well spaced apart in the reservoir from the injection well. Flood water can be injected following the thickened aqueous flooding medium to complete the flooding operation. Alternatively, a series of alternate slugs of soluble oil and low salt content water can be injected.

More specifically, this invention involves a flooding process in which oil is displaced from a subterranean oil-bearing reservoir by one or more slugs of substantially anhydrous soluble oil followed immediately by a slug of low salt-content water. These injected fluids are then displaced through the reservoir by floodwater thickened by the addition of an agent that reduces its mobility. In the practice of this invention, a slug of substantially anhydrous soluble oil is injected into the reservoir through one or more injection or input wells penetrating the oil-bearing formation and followed directly by the injection of a slug of low salt-content water. The fluids are forced through the reservoir toward at least one production or output well similarly completed in the reservoir by the subsequently injected thickened flood water. The thickened flood water can be followed by the injection of conventional flood water. As the flooding medium passes through the reservoir, residual oil is displaced and moved into the producing well whereupon it can be recovered by conventional means. The injection and production wells can be arranged in any convenient pattern designed to achieve maximum contact of the oil-bearing zones by the advancing flood front, such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The soluble oils used herein are oleaginous compositions which are miscible with the connate oil and have the ability to spontaneously emulsify with water when admixed therewith, their emulsibility with water depending in part upon the salt content of the water, lower salt content water being more readily emulsified. These soluble oils comprise a liquid hydrocarbon, one or more selected surface active agents, and optionally, a stabilizing agent. The emulsions formed by the addition of water to a soluble oil are of the water-in-oil type, in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging, and do not separate into visibly distinct separate phases on storage at temperatures within a specified range, the specific temperature range depending on the particular soluble oil composition. By transparent, it is meant that the microemulsions do not have a cloudy or opaque appearance, even though they may contain color bodies. It is recognized, of course, that some cloudiness may appear at certain water concentrations without adversely affecting the utility of the microemulsion in removing oil from that portion of the formation which it contacts. Emulsions of this type are designated microemulsions to distinguish them from ordinary water-in-oil macroemulsions in which the lower limit in the size of the water droplets is about 0.1 micron. At water concentrations above the inversion concentration, the emulsion inverts to an emulsion of the oil-in-water type in which droplets of oil are dispersed in a continuous water phase.

One of the major constituents of the soluble oil composition useful in the practice of this invention is a liquid hydrocarbon, which can comprise a crude petroleum oil, such as a crude oil previously recovered from the reservoir, or other conveniently available crude oil; a refined or semi-refined petroleum product, such as gasoline, naphtha, stove oil and diesel; a residual product obtained by the distillation of lower boiling fractions from a crude oil, such as bunker fuel oil and other residual products; a low value refinery by-product, such as catalytic cycle oil, lube oil extract, and the like; and liquified normally gaseous hydrocarbons, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

Surface active materials which can be used are those that when admixed with the liquid hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene monosulfonates and alkyl sodium polyaryl monosulfonates having molecular weights of more than about 400. The preferred preferentially water-soluble organic sulfonates include water-soluble alkyl aryl sulfonates. The water-soluble alkyl aryl sufonates are generally those which in the form of their sodium salts have molecular weights of less than about 400 or which contain more than one sulfonic acid group per molecule. It has been found that in soluble oils compounded from petroleum crude oil or other high boiling hydrocarbons, superior results are obtained by employing as the preferentially oil-soluble organic sulfonate an alkyl aryl monosulfonate which in the form of its sodium salt has a molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl monosulfonate or mixture of monosulfonates which in the form of their sodium salts have molecular weights of more than about 400, and a preferentially water-soluble organic sulfonate, such as an alkyl aryl sulfonate or mixture of monosulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl monosulfonate which in the form of its sodium salt has molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction on sulfonation mixtures of alkyl aryl, monosulfonates are produced which may be either preferentially water-soluble or preferentially oil-soluble. The term "petroleum sulfonates" is a commercial designation of sulfonates which are obtained by a treatment of petroleum fractions, particularly solvent treated aromatic fractions, with sulfuric acid, fuming sulfuric acid or sulfur trioxide, followed by neutralization to form the sulfonates. Upon sulfonation, two general types of products are formed which are designated mahogany acids and green acids. The terminology is based on the colors imparted to the respective oil and water phases produced in the sulfonation process, a brownish color being imparted to the oil phase by oil-soluble sulfonic acids and a greenish color being imparted to the aqueous phase by the water-soluble sulfonic acids. The mahogany acids and green acids can be neutralized to form mahogany sulfonates and green sulfonates. The mahogany sulfonates are preferentially oil-soluble, and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water soluble agent. Although the optimum surfactant combination is dependent upon the characteristics of the particular reservoir, in many operations it is found the superior results are obtained with a surfactant combination containing about 1 to 4 parts of preferentially oil-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated organic liquids such as monohydric and polyhydric alcohol, secondary butyl alcohol, methyl ethyl ketone, glycol agents found particularly useful include isopropyl alcohol, secondary butyl alcohol, methyl ethyl ketone, glycol monoethyl ether (Cellosolve), glycol monobutyl ether (butyl Cellosolve), and diethylene glycol monobutyl ether (butyl Carbitol).

The soluble oils employed in the practice of this invention are substantially anhydrous in that they contain little, if any, added water. However, it is well known that some of the ingredients from which soluble oils are compounded, such as the hydrocarbon, the stabilizing agent and the petroleum sulfonates, can contain minor proportions of water, and that it is difficult and costly to dehydrate these agents to remove all traces of water. Also, it may be advantageous when compounding the soluble oil to add a small amount of water to the composition. Thus, it is within the scope of this invention to employ anhydrous and substantially anhydrous soluble oils as the oil-miscible displacement agent. The term "substantially anhydrous" as used herein is meant to include soluble oils having not more than minor amounts of water. More particularly, these soluble oils contain less than 10 volume percent water, and preferably less than about 5 volume percent water. In any event, the substantially anhydrous soluble oils useful in the practice of this invention are to be distinguished from the prior art microemulsions containing substantial quantities of water, such as from about 10 to 50 percent or more water.

The soluble oil compositions useful in the practice of this invention can be prepared by any of the conventional techniques. One suitable method of preparing these compositions is to first admix the hydrocarbon base stock, surface active material and stabilizer in the desired proportions to form an anhydrous soluble oil containing only incidental water. Thereafter, if desired, a small amount of water can be added to obtain a microemulsion of the desired water content. Preferably, the water employed in forming the microemulsion in a salt-containing fesh water having a dissolved salt content of less than about 6000 p.p.m.

Thus, in a preferred embodiment of this invention, a liquid hydrocarbon, such as a previously recovered reservoir oil; a surface active agent, such as a mixed alkyl aryl petroleum sulfonate; and a stabilizing agent, such as secondary butyl alcohol, glycol monoalkyl ether, or other partially oxygenated organic stabilizing agent, are admixed to obtain a substantially anhydrous soluble oil comprised of 52 to 89 volume percent hydrocarbon, 9 to 30 volume percent surface active material and 2 to 8 volume percent of stabilizing agent. Also, where the liquid hydrocarbon has a relatively high viscosity, a quantity of low viscosity, light liquid hydrocarbon can be substituted for a portion of the liquid hydrocarbon to increase the mobility of the resulting soluble oil to obtain a more favorable mobility ratio between the soluble oil slug and the following drive fluid. The light liquid hydrocarbon will usually not constitute more than 25 percent by volume of the soluble oil composition.

In the practice of this invention, the soluble oil prepared in the foregoing manner is injected into the reservoir through one or more injection wells in an amount equivalent to 0.01 to 0.15 pore volume of the reservoir to be treated. Low salt-content water is then injected in an amount not exceeding the volume of soluble oil injected, and preferably in an amount equal to about 50 to 100 percent of the volume of the soluble oil. For example, where the soluble oil is injected in an amount equal to 0.05 pore volume, the low salt-content water is injected in an amount not exceeding 0.05 pore volume, and preferably, in an amount equal to 0.025 to 0.05 pore volume.

The term "low salt-content water" is meant to include fresh water having a low salt content, and more particularly, fresh water having less than 1.0 weight percent total dissolved salts. Further, it is preferred that the low salt-content water contain less than 0.6 weight percent (6000 parts per million) total dissolved salts. Also, the salts of polyvalent metals, such as calcium and magnesium, are particularly detrimental, and it is preferred that the low salt-content water be low in the salts of polyvalent metals. In particular, it is preferred that this water contain less than 0.1 weight percent (1000 p.p.m.) salts of polyvalent metals, and more preferably, less than 0.01 weight percent (100 p.p.m.) of these salts.

In an alternative embodiment of the invention, a series of successive small slugs of the substantially anhydrous soluble oil and low salt-content water are alternately injected through the injection well and into the reservoir until the desired quantity of these fluids have been injected. Thus, it is preferred in the practice of this embodiment of the invention that a small slug of substantially anhydrous soluble oil is injected into the reservoir to be treated and followed by a slug of low-salt-content water in an amount not exceeding the vlume of soluble oil injected, and preferably in an amount equal to about 50 to 100 percent of the volume of the soluble oil. Then another slug of soluble oil is injected and followed by a slug of low salt-content water. The successive injection of alternate slugs of soluble oil and low salt-content water is continued until the desired quantities of fluids are injected. Although the soluble oil can be injected in any number of slugs, it is usually of little advantage to employ more than ten slugs of soluble oil, and preferably between three and six slugs are employed which are alternated with low salt-content water. Each soluble oil slug is preferably injected in an amount equivalent to 0.002 to 0.05 pore volume and each low salt-content water slug is injected in an amount between 0.001 to 0.05 pore volume that is equivalent to 50 to 100 percent of the volume of the soluble oil. Also, the size of individual slugs can be varied within these ranges as it is not necessary that individual slugs be of the same size through the injection.

Upon completing the injection of soluble oil and low salt-content water thickened aqueous flooding medium is then injected to displace the soluble oil and low salt-content water toward at least one production well spaced apart in the reservoir from the injection well, and from which fluids are produced in conventional manner. The aqueous flooding medium can comprise water or brine, and is made more viscous by the addition of a thickening agent to reduce the mobility of the medium in the porous formation. In a preferred mode of practicing this invention, thickening agent is added to only an initial portion of the flood water.

The various known viscosity increasing additives which can be employed to thicken the flood water include fatty acid soaps, alginates, sucross, dextrans, amines, glycerine, finely divided clays such as montmorillonite, and a number of water-soluble polymers. Of these, the water soluble polymers are generally preferred. Water-soluble polymers useful in the practice of this invention include modified starches, Xanthum gum obtained by the fermentation of starch-derived sugar, alkyl and hydroalkyl cellulose derivatives, carboxymethyl cellulose, polyvinyl alcohol, polyvinyl pyrrolidone, polyacryic acid, polyacrylamide, polystyrene sulfonates, ethylene oxide polymers, and various homologs of these polymers, and copolymers of two or more of these materials, or copolymers of the aforementioned polymers with other polymerizable substances.

One specific polymer found especially useful in thickening the aqueous floating medium is hydroxyethyl cellulose. Another preferred polymer is a partially hydrolyzed polyacrylamide, and particularly such polymer having between about 2 to about 67 percent of the carboxamide groups hydrolyzed to carboxy groups and characterized by a molecular weight of at least 500,000 and preferably 1,000,000 or more. With these high molecular weight polyacrylamides, it is possible to obtain aqueous solutions having a desirably increased viscosity with the use of a minimum amount of polymeric ingredient. Further, the viscosity of a standard solution of polymer under controlled conditions is correlated with the molecular weight of the polymer. Accordingly, the hydrolyzed polyacrylamide preferred for use in this invention are those characterized by a viscosity of at least 6 centiposes for a 0.5 percent by weight solution thereof in aqueous 4 percent by weight sodium chloride solution at a temperature of 25° C. as determined with an Oswald viscosimeter.

The term "hydrolyzed polyacrylamide" as employed herein is inclusive of the modified polymers wherein the carboxyl groups are in the acid form and also wherein the carboxyl groups are in the salt form, provided that the salts are water-soluble. Thus, for example, the hydrolyzed polyacrylamide can be employed in the form of the sodium, potassium, or other alkali metal salt, the ammonium salt, or mixed salts of sodium, potassium, magnesium, calcium and the like. Salts of polyvalent ions, such as iron and aluminum, are to be avoided as these are usually insoluble in water. The polyacrylamides, from which the hydrolyzed polyacrylamides useful in this invention are derived, may be homopolymers of acrylamide or copolymers thereof with other suitable polymerizable vinyl compounds such as vinyl acetate, acrylonitrile, methyl acrylonitrile, vinyl alkyl ether, vinyl chloride, and the like, provided that the copolymers so employed are characterized by water solubility and freedom from cross-linking. Particularly preferred copolymers are those formed by the copolymerization of acrylamide with maleic anhydride or acrylic acid.

The thickened aqueous flooding medium is prepared by dissolving a suitable thickening agent in water or brine in an amount sufficient to reduce the mobility of the medium to a desired value when it is passed through a porous body. In particular applications, it may be desirable to soften or deionize the water. Preferably, sufficient of the thickening agent is added to reduce the mobility of the thickened aqueous flooding medium to a value not greater than that of the soluble oil at formation conditions. Thus, it is preferred that the mobility of the flood water be reduced so that the relative mobility of the soluble oil with respect to the thickened flood water as defined by the ratio of the mobility of the soluble oil divided by the mobility of the thickened flood water is greater than 1.0. In the case of the preferred thickening agents, mobility control can usually be achieved by the addition of about 0.002 to about 0.5 weight percent of the polymer, although in particular applications, solutions containing more or less polymers can be employed where desired.

In a preferred mode of practicing this invention, 0.01 to 0.15 pore volume of substantially anhydrous soluble oil is injected into the formation and followed directly by the injection of low salt-content salt water in an amount not exceeding the volume of soluble oil injected, or these fluids are injected as a series of alternate slugs of soluble oil and low salt-content water. The injected fluids are displaced through the formation by injecting a substantially larger volume of thickened aqueous flooding medium followed by flood water or brine. Preferably the soluble oil and low salt-content water is displaced through the formation by injecting 0.1 to 0.8 pore volume of thickened flood water followed by flood water or brine.

As heretofore disclosed, the soluble oil injected into the reservoir is miscible in all proportions with the reservoir crude oil. Although the exact mechanism by which the injected fluids operate to increase oil recovery is not completely understood, it is believed that oil is displaced from the reservoir by miscible displacement with the soluble oil as the soluble oil slug is driven through the reservoir. Also depending upon its salt content, connate water may be displaced ahead of the soluble bank by emulsification with the soluble oil. Additionally, the soluble oil emulsifies with low salt-content water at the soluble oil-low salt-content water interface to expand the volume of the soluble oil slug and to effect substantially complete displacement of the soluble oil through the formation. However, while the exact mechanism by which the fluids injected in the practice of this invention operate to effect recovery of oil from subterranean reservoirs is not completely understood, it has nevertheless been demonstrated that additional quantities of oil can be economically recovered by the method of this invention than by prior art methods.

Also, the injection of the soluble oil as a series of slugs alternated with low salt-content water is particularly advantageous in heterogeneous reservoirs, it is believed that the initial slug or slugs of soluble oil enter into the more permeable zones whereupon they become admixed with low salt-content water to form microemulsions. Since these emulsions are of decreased mobility, they act to divert subsequently injected slugs into less permeable zones.

Further, it is known that water-in-oil microemulsions formed by the addition of water to soluble oil exhibit substantially higher viscosities than either the water or soluble oil individually, often causing these microemulsions to be difficult to inject into the formation. Formation of the microemulsion in situ by the sequential injection of substantially anhydrous soluble oil and low salt-content water overcomes this injection problem as the individual slugs are more readily injected and the higher viscosity microemulsions are not formed in significant quantities in the critical zone adjacent to the injection wall.

The invention is further described by the following examples which are illustrative of specific modes of practicing the invention and are not intended as limiting the scope of the invention as defined by the appended claims.

EXAMPLE 1

The increased recovery obtainable by the method of this invention is illustrated by the following series of tests.

A number of 6-foot long by 2-inch diameter sand packs are prepared by packing Nevada 130 sand in a transparent plastic tube. The sand packs are first saturated with brine containing 2.0 weight percent sodium chloride, 0.5 weight percent calcium chloride, and 0.3 weight percent magnesium chloride, and then with an Illinois crude oil having a viscosity of about 7 cp. at test conditions. Water permeabilities of the individual sand packs are compared to insure similarity of the test cores. The sand packs are then water flooded with the same brine to a residual oil saturation of 28 to 30 pore volume percent to simulate a reservoir flooded by conventional water flooding. The individual oil recovery tests are performed by displacing a slug of miscible displacement fluid through the sand pack with drive fluid. Fluids produced from the sand pack are collected and the volume of produced oil measured.

In Test 1A, .025 pore volume of a substantially anhydrous soluble oil is injected into the sand pack and driven threthrough by the subsequent injection of 0.40 pore volume of thickened flood water followed by brine. The soluble oil has the following composition:

| | Volume percent |
|---|---|
| Illinois crude oil | 69.2 |
| Butyl Cellosolve | 6.4 |
| Petroleum sulfonates | 20.4 |
| Water | 4.0 |

The flood water is thickened by the addition of 0.2 weight percent of a partially hydrolyzed polyacrylamide marketed by the Dow Chemical Company under the trademark Pusher 500. An oil recovery of 82.2 volume percent of the residual oil is obtained by the injection of 1.0 pore volume of fluids, and 87.8 percent, by the injection of 1.5 pore volumes. This amounts to 10.3 barrels of oil recovered per barrel of soluble oil injected.

Test 1B is conducted by repeating Test 1A excepting that the soluble oil slug is reduced to 0.015 pore volumes. Oil recovery is 74.0 volume percent of the residual oil after 1.0 pore volume of fluid injection, and 81.3 volume percent after 1.5 pore volumes. This is equivalent to 15.4 barrels of oil recovered per barrel of soluble oil injected.

Test 1C illustrates the use of water-in-oil microemulsions displaced by thickened flood water. The test is conducted by injecting 0.025 pore volumes of a water-in-oil microemulsion into a sand pack and driving the slug through the formation by the subsequent injection of 0.40 pore volume of flood water, thickened as described above, followed by brine. The microemulsion has the following composition:

| | Vol. percent |
|---|---|
| Illinois crude oil | 40.0 |
| Butyl Cellosolve | 3.7 |
| Petroleum sulfonates | 11.8 |
| Water | 44.5 |

An oil recovery of 80.6 volume percent of the residual oil is obtained by the injection of 1.0 pore volume of fluids, and 85.2 percent by the injection of 1.5 pore volume, which is equivalent to 9.4 barrels of oil per barrel of microemulsion.

Test 1D is conducted by repeating Test 1C excepting that the slug of microemulsion is reduced to 0.015 pore volume. Oil recovery is 76.1 volume percent of the residual oil after 1.0 pore volume of fluid injection, and 77.3 percent after 1.5 pore volumes. This oil recovery amounts to 15.0 barrels of oil per barrel of microemulsion.

The increased oil recovery obtainable by the method of this invention is illustrated by Test 1E. The test is conducted by injecting 0.015 pore volume of the substantially anhydrous soluble oil employed in Test 1A, 0.01 pore volume of fresh water, and driving these slugs through the sand pack with 0.40 pore volume of flood water thickened by the addition of 0.2 weight percent of Pusher 500 followed by brine. An oil recovery of 85.4 volume percent of the residual oil is obtained after injecting 1.0 pore volume of fluids and 87.0 volume percent by the injection of 1.5 pore volumes, which amounts to 18.4 barrels of soluble oil per barrel of soluble oil injected.

These data are summarized in Table 1.

TABLE 1

| | Miscible displacement fluid | | | Oil recovery [1] | | |
|---|---|---|---|---|---|---|
| Test No. | Type | Slug size, p.v. | Drive fluid | Percent residual oil at 1 pore vol. | Percent residual oil at 1.5 pore vol. | Bbls. of oil per bbl. of soluble oil |
| 1A | Anhydrous | 0.025 | 0.40 p.v. thickened water, then brine | 82.2 | 87.8 | 10.3 |
| 1B | do | 0.015 | do | 74.0 | 81.3 | 15.0 |
| 1C | Microemulsion | 0.025 | do | 80.6 | 85.2 | 9.4 |
| 1D | do | 0.015 | do | 76.1 | 77.3 | 15.0 |
| 1E | Anhydrous | 0.015 | 0.01 p.v. fresh water thickened water, then brine. | 85.4 | 87.0 | 18.4 |

[1] Oil recoveries based on the residual oil saturation and the oil content of the soluble oil injected.

The foregoing tests illustrate the superiority of the method of the present invention is increasing oil recovery from water flooded reservoirs. It is apparent that this method is superior to a miscible displacement using water-in-oil micro-emulsions, and that oil recoveries comparable to those obtaind with anhydrous soluble oils can be obtained while using only 60 percent of the amount of soluble oil.

EXAMPLE 2

The improved injectivity obtainable by the method of the present invention is illustrated by the following tests.

Two 6-foot long by 2-inch diameter sand packs are prepared and reduced to residual oil saturation by the technique described in Example 1. The water permeabilities of the respective sand packs are 5660 and 5400 md., respectively.

A first sand pack is treated by injecting 0.015 pore volume of a water-in-oil microemulsion containing about 44.5 percent water and having a Brookfield viscosity of 30.4 cp. at 6 r.p.m. The microemulsion is displaced through the sand pack with 0.40 pore volume of flood water thickened by the addition of 0.2 weight percent Pusher 500 and then by brine. The fluid injection is 1.35 cc./min. at 10 p.s.i.g. injection pressure.

The second sand pack is treated by injecting 0.015 pore volume of substantially anhydrous soluble oil having a Brookfield viscosity of 21.6 cp. at 6 r.p.m. 0.01 pore volume of fresh water, 0.40 pore volume of thickened flood water and then brine. Fluid injection is 1.56 cc./min. at 10 p.s.i.g. injection pressure.

EXAMPLE 3

The embodiment of this invention employing the injection of a series of alternate slugs of substantially anhydrous soluble oil and low salt-content water is illustrated by the following test.

A 6-foot long sand pack is prepared and flooded to residual oil saturation by the technique of Example 1. Next, a series of slugs of substantially anhydrous soluble oil of the same composition as the substantially anhydrous soluble oil of Example 1 and low salt-content water is injected in the following sequence:

(1) 0.005 pore volume soluble oil.
(2) 0.003 pore volume low salt-content water.
(3) 0.005 pore volume soluble oil.
(4) 0.003 pore volume low salt-content water.
(5) 0.005 pore volume soluble oil.
(6) 0.003 pore volume low salt-content water.

The low salt-content water contains about 628 p.p.m. total dissolved salts including 86 p.p.m. calcium salts and 23 p.p.m. magnesium salts. These fluids are displaced through the said pack by the injection of 0.40 pore volume thickened aqueous flooding medium and then by conventional flood water.

An oil recovery of 87.1 percent of the residual oil is obtained after 1.0 pore volume of fluid injection, and 88.3 percent after 1.5 pore volume.

EXAMPLE 4

A miscible flooding operation is conducted on an oil-containing reservoir in accordance with the method of this invention. Four injection wells are arranged in a rectangular pattern around a single centrally located production well. A substantially anhydrous soluble oil comprised of 72 volume percent hydrocarbon, 21 volume percent petroleum sulfonates and 7 volume percent of partially oxygenated organic stabilizers is injected into the reservoir in an amount equivalent to 0.05 pore volume. Next, 0.03 pore volume of low salt-content fresh water is injected. These fluids are displaced through the reservoir towards the central producing well by the subsequent injection of 0.50 pore volume of aqueous flooding medium thickened by the addition of 0.15 weight percent of hydroxyethyl cellulose marketed by the Hercules Powder Company under the trademark Natrasol. Oil and other produced fluids are recovered from the central producing well.

Various embodiments and modifications of this invention have been described in the foregoing description and examples, and further modifications will be apparent to those skilled in the art. Such modifications are included within the scope of this invention as defined by the following claims.

Having now described the invention, we claim:

1. A method for recovering petroleum from a subterranean reservoir penetrated by an injection well and a production well spaced apart in the reservoir, which comprises:

injecting a slug of substantially anhydrous soluble oil through said injection well and into said reservoir;

next injecting a slug of low salt-content water, the volume of said slug being not greater than the volume of said slug of soluble oil;

thereafter injecting thickened aqueous flooding medium to displace said previously injected fluids through said reservoir; and recovering petroleum from said production well.

2. The method defined in claim 1 wherein said soluble oil is injected in an amount equivalent to 0.01 to 0.15 pore volume.

3. The method defined in claim 1 wherein said low salt-content flood water is injected into said reservoir in an amount equivalent to 50 to 100 percent of the volume of said soluble oil injected.

4. The method defined in claim 1 wherein said low salt content water contains less than 1 weight percent total dissolved salts.

5. The method defined in claim 1 wherein flood water is injected following said thickened aqeuous flooding medium to drive said previously injected fluids through the reservoir.

6. The method defined in claim 1 wherein a series of successive slugs of said substantially anhydrous soluble oil and said low salt-content water are alternately injected into said reservoir prior to the injection of said thickened aqueous flooding medium.

7. A method for recovering petroleum from a subterranean reservoir penetrated by an injection well and a production well spaced apart in the reservoir, which comprises:

injecting 0.01 to 0.15 pore volume of substantially anhydrous soluble oil through said injection well and into said reservoir;

next injecting a slug of low salt-content water containing less than 1.0 weight percent total dissolved salts, said low salt-content water being injected in a volume not greater than the volume of said slug of soluble oil;

thereafter injecting a thickened aqueous flooding medium;

injecting flood water to drive said previously injected fluids through the reservoir; and recovering petroleum from said production well.

8. The method defined in claim 7 wherein said low salt-content water is injected into said reservoir in an amount equivalent to 50 to 100 percent of the volume of said soluble oil injected.

9. The method defined in claim 7 wherein said soluble oil is comprised of 52 to 88 volume percent hydrocarbon, 9 to 30 volume percent surface active material, 3 to 8 volume percent of partially oxygenated organic stabilizing agent, and not more than 10 volume percent water.

10. The method defined in claim 7 wherein said low salt-content water contains less than 0.1 weight percent total dissolved salts and less than 0.01 weight percent of salts of polyvalent metals.

11. The method defined in claim 7 wherein said thickened aqueous flooding medium is thickened by the addition of a small amount of water-soluble polymer.

12. The method defined in claim 7 wherein a series of successive slugs of said substantially anhydrous soluble oil and said low salt-content water are alternately injected into said reservoir prior to the injection of said thickened aqueous flooding medium.

13. A method for recovering petroleum from a subterranean reservoir penetrated by an injection well and a production well spaced apart in the reservoir, which comprises:

injecting 0.01 to 0.15 pore volume of substantially anhydrous soluble oil through said injection well and into said formation, said soluble oil comprising 52 to 88 volume percent hydrocarbon, 9 to 30 volume percent of surface active material, 3 to 8 volume percent of partially oxygenated organic stabilizing agent, and not more than 10 volume percent water;

next injecting a slug of low salt-content water containing less than 0.1 weight percent total dissolved salts and less than 0.01 weight percent of salts of polyvalent metals, said low salt-content water being injected in an amount equivalent to 50 to 100 percent of the volume of said soluble oil injected;

thereafter injecting 0.01 to 0.80 pore volume of aqueous flooding medium thickened by the addition of a small amount of water-soluble polymer; and recovering petroleum from said production well.

14. The method defined in claim 13 wherein said water-soluble polymer is partially hydrolyzed polyacrylamide.

15. The method defined in claim 13 wherein said water-soluble polymer is hydroxyethyl cellulose.

16. The method defined in claim 13 wherein a series of successive slugs of said substantially anhydrous soluble oil and said low salt-content water are alternately injected into the reservoir.

17. A method for recovering petroleum from a subterranean reservoir penetrated by an injection well and a production well spaced apart in the reservoir, which comprises:

injecting a series of successive alternate slugs of substantially anhydrous soluble oil and low salt-content water through said injection well and into said reservoir, the volume of said slugs of low salt-content water being not greater than the volume of said slug of soluble oil;

thereafter injecting a thickened aqueous flooding medium;

injecting flood water to drive said previously injected fluids through the reservoir; and recovering petroleum from said production well.

18. The method defined in claim 17 wherein said low salt-content water contains less than 1 weight percent total dissolved salts.

19. The method defined in claim 17 wherein said slugs of low salt-content water have a volume equivalent to 50 to 100 percent of the volume of said soluble oil slugs.

20. The method defined in claim 17 wherein said soluble oil is comprised of 52 to 88 volume percent hydrocarbon, 9 to 30 volume percent surface active material; 3 to 8 volume percent of partially oxygenated organic stabilizing agent, and not more than 10 volume percent water.

21. The method defined in claim 17 wherein said low salt-content water contains less than 0.1 weight percent total dissolved salts and less than 0.01 weight percent salts of polyvalent metals.

22. The method defined in claim 17 wherein said thickened aqueous flooding medium is thickened by the addition of a small amount of water-soluble polymer.

23. The method defined in claim 22 wherein said water-soluble polymer is partially hydrolyzed polyacrylamide.

24. The method defined in claim 23 wherein said water-soluble polymer is hydroxyethyl cellulose.

25. The method defined in claim 17 wherein said slugs of substantially anhydrous soluble oil are injected in an amount equivalent to 0.002 to 0.05 pore volume.

References Cited

UNITED STATES PATENTS

| | | | |
|---|---|---|---|
| 3,163,214 | 12/1964 | Csaszar | 166—274 |
| 3,249,157 | 5/1966 | Brigham et al. | 166—273 |
| 3,266,570 | 8/1966 | Gogarty | 166—273 |
| 3,292,696 | 12/1966 | Sandiford | 166—273 |
| 3,297,085 | 1/1967 | Herring | 166—273 |
| 3,324,944 | 6/1967 | Poettmann | 166—273 |
| 3,343,597 | 9/1967 | Gogarty et al. | 166—273 |
| 3,356,138 | 12/1967 | Davis et al. | 166—274 |
| 3,406,754 | 10/1968 | Gogarty | 166—273 |
| 3,412,791 | 11/1968 | Gogarty | 166—273 |
| 3,437,141 | 4/1969 | Brandner et al. | 166—273 |

STEPHEN J. NOVOSAD, Primary Examiner

UNITED STATES PATENT OFFICE
CERTIFICATE OF CORRECTION

Patent No. 3,500,922          Dated March 17, 1970

Inventor(s) Leo J. O'Brien and Le Roy W. Holm

It is certified that error appears in the above-identified patent and that said Letters Patent are hereby corrected as shown below:

In the specification, column 5, change the 4th paragraph beginning with line 61 to read as follows:

The various stabilizing agents that are admixed with the soluble oil to improve the properties and stability of the resulting microemulsions formed by admixing the soluble oil with water include partially oxygenated organic liquids such as monohydric and polyhydric alcohols, ketones, ethers and polyhydric alkyl ethers. Specific agents found particularly useful include isopropyl alcohol, secondary butyl alcohol, methyl ethyl ketone, glycol monoethyl ether (Cellosolve), glycol monobutyl ether (butyl Cellosolve), and diethylene glycol monobutyl ether (butyl Carbitol).

SIGNED AND SEALED
OCT 6 - 1970

(SEAL)
Attest:

Edward M. Fletcher, Jr.
Attesting Officer

WILLIAM E. SCHUYLER, JR.
Commissioner of Patents